US012630055B2

(12) United States Patent (10) Patent No.: US 12,630,055 B2
Jin (45) Date of Patent: May 19, 2026

(54) METHOD AND APPARATUS FOR BATTERY CONDITIONING OF ECO-FRIENDLY VEHICLE

(71) Applicants: Hyundai Motor Company, Seoul (KR); Kia Corporation, Seoul (KR)

(72) Inventor: Soo Yang Jin, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 70 days.

(21) Appl. No.: 18/663,299

(22) Filed: May 14, 2024

(65) Prior Publication Data

US 2025/0187495 A1 Jun. 12, 2025

(30) Foreign Application Priority Data

Dec. 8, 2023 (KR) ........................ 10-2023-0177708

(51) Int. Cl.
B60L 58/26 (2019.01)
H01M 10/613 (2014.01)
(Continued)

(52) U.S. Cl.
CPC ........... B60L 58/26 (2019.02); H01M 10/613 (2015.04); H01M 10/625 (2015.04);
(Continued)

(58) Field of Classification Search
CPC .... B60L 58/26; B60L 2240/36; B60L 3/0046; B60L 58/12; B60L 2240/545;
(Continued)

(56) References Cited

U.S. PATENT DOCUMENTS 9,178,379 B2 * 11/2015 Choi ......................... H02J 7/65
2011/0316486 A1 * 12/2011 Inaba .................... H01M 10/48
320/150

(Continued)

FOREIGN PATENT DOCUMENTS

CN 115004048 A 9/2022
EP 2586089 * 10/2017
(Continued)

*Primary Examiner* — Muhammad Shafi

(74) *Attorney, Agent, or Firm* — Morgan, Lewis & Bockius LLP

(57) ABSTRACT

In a method and apparatus for battery conditioning of an eco-friendly vehicle, the battery conditioning method includes: comparing a charging completion expected temperature, which is a temperature of a battery provided in the vehicle expected at a point in time when fast charging is to be completed, and a high-power driving target temperature, which is a target temperature of the battery required at a point in time when high-power driving is to begin, upon identifying that the high-power driving is to be performed within a preset time period from a point in time when the fast charging of the battery is completed; and cooling the battery in a first cooling mode during the fast charging, upon concluding that the charging completion expected temperature is higher than the high-power driving target temperature.

20 Claims, 2 Drawing Sheets

(51) Int. Cl.
| | |
|---|---|
| *H01M 10/625* | (2014.01) |
| *H01M 10/633* | (2014.01) |
| *H01M 10/6561* | (2014.01) |
| *H01M 10/6567* | (2014.01) |

(52) U.S. Cl.
CPC ..... *H01M 10/633* (2015.04); *H01M 10/6561* (2015.04); *H01M 10/6567* (2015.04); *B60L 2240/36* (2013.01); *H01M 2220/20* (2013.01)

(58) Field of Classification Search
CPC .......... B60L 2240/549; B60L 2260/50; H01M 10/613; H01M 10/625; H01M 10/633; H01M 10/6561; H01M 10/6567; H01M 2220/20; Y02T 10/70; Y02T 10/7072; B60Y 2200/91
USPC .......................................................... 701/22
See application file for complete search history.

(56) References Cited

U.S. PATENT DOCUMENTS

| | | | |
|---|---|---|---|
| 2014/0303826 A1 | 10/2014 | Kobayashi et al. | |
| 2016/0200216 A1* | 7/2016 | Fultz ...................... B60L 58/21 | |
| | | | 320/136 |
| 2017/0084969 A1* | 3/2017 | Choi ................... H01M 10/633 | |
| 2021/0221254 A1* | 7/2021 | Abe ........................ B60L 58/26 | |
| 2023/0327474 A1* | 10/2023 | Morikawa .............. B60L 58/26 | |

FOREIGN PATENT DOCUMENTS

| | | | |
|---|---|---|---|
| JP | 2022-151635 A | | 10/2022 |
| JP | 2023-019523 A | | 2/2023 |
| KR | 10-0747448 B1 | | 8/2007 |
| KR | 101998069 | * | 7/2019 |
| KR | 10-2021-0016797 A | | 2/2021 |
| KR | 10-2023-0040659 A | | 3/2023 |

* cited by examiner

METHOD AND APPARATUS FOR BATTERY CONDITIONING OF ECO-FRIENDLY VEHICLE

CROSS REFERENCE TO RELATED APPLICATION

The present application claims priority to Korean Patent Application No. 10-2023-0177708, filed Dec. 8, 2023, the entire contents of which is incorporated herein for all purposes by this reference.

BACKGROUND OF THE PRESENT DISCLOSURE

Field of the Present Disclosure

The present disclosure relates to a battery management system, and more particularly to a method and apparatus for managing a battery temperature of an eco-friendly vehicle after fast charging or under high-temperature conditions.

Description of Related Art

Hybrid electronic vehicles (HEVs), plug-in HEVs (PHEVs), electronic vehicles (EVs), and the like eco-friendly vehicles include built-in batteries that are storage devices for storing electrical energy to drive their motors, in particular, built-in high-voltage batteries which are different from low-voltage batteries mounted to conventional internal combustion engine vehicles.

Due to the chemical properties of materials that make up such a high-voltage battery, the performance and efficiency of the high-voltage battery may deteriorate depending on the temperatures of the outside air. Therefore, the high-voltage battery needs to be maintained at an optimum temperature.

In this regard, a related art only focuses on how to manage the temperature of the battery during charging while parking or driving, and disadvantageously does not consider a disadvantage that situations where the temperature of the battery needs to be managed after fast charging or under high-temperature conditions.

Accordingly, in the present technical field, it is required to preemptively optimize the temperature of the battery when the vehicle is driven at predetermined power under the condition that the temperature of the battery is high, preventing the driving performance of the vehicle from deteriorating due to battery power derating.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method and apparatus for battery conditioning of an eco-friendly vehicle, in which the temperature of a battery is preemptively optimized when the vehicle is driven at high power under conditions that the temperature of the battery is high, preventing the driving performance of the vehicle from deteriorating due to battery power derating.

Technical problems to be solved in the present disclosure are not limited to the forementioned technical problems, and other unmentioned technical problems may be clearly understood from the following description by a person having ordinary knowledge in the art to which the present disclosure pertains.

According to an exemplary embodiment of the present disclosure, a battery conditioning method of an eco-friendly vehicle includes: comparing a charging completion expected temperature, which is a temperature of a battery provided in the vehicle expected at a point in time when fast charging is to be completed, and a high-power driving target temperature, which is a target temperature of the battery required at a point in time when high-power driving is to begin, upon receiving information related to a schedule to perform the high-power driving within a preset time period from a point in time when the fast charging of the battery is completed; and cooling the battery in a first cooling mode during the fast charging, upon concluding that the charging completion expected temperature is higher than the high-power driving target temperature.

In the instant case, the battery conditioning method may include: comparing a time required to cool the battery to the high-power driving target temperature and a time required for the vehicle to arrive at a destination from the point in time when the fast charging is to be completed; and derating a charging current for the battery, upon concluding that the time required to cool the battery to the target temperature is longer than the time required for the vehicle to arrive at the destination after completing the fast charging.

In the instant case, the battery conditioning method may include cooling the battery in a second cooling mode different from the first cooling mode, upon concluding that the charging completion expected temperature is equal to or lower than the high-power driving target temperature.

In the instant case, the battery conditioning method may include identifying whether the battery is fast charging by an external power source, wherein the comparing the charging completion expected temperature and the high-power driving target temperature is performed upon identifying that the battery is fast charging by the external power source.

In the instant case, the battery conditioning method may further include: comparing a current temperature of the battery and a preset threshold temperature, upon concluding that the battery is not fast charging by the external power source; and cooling the battery in the first cooling mode, upon concluding that the temperature of the battery is higher than the preset threshold temperature.

In the instant case, the battery conditioning method may further include cooling the battery in a second cooling mode different from the first cooling mode, upon concluding that the temperature of the battery is equal to or lower than the preset threshold temperature.

In the instant case, the first cooling mode may be a maximum cooling mode in which a cooling system is used.

In the instant case, the second cooling mode may be a normal cooling mode which is performed by default during charging.

In the instant case, the derating the charging current may include derating the charging current by matching an initial temperature of the battery, which may be cooled to the high-power driving target temperature by the time required to arrive at the destination from the point in time when the charging of the battery is to be completed, with that in a fast-charging map, so that the temperature of the battery can reach the initial temperature and then attain a state of equilibrium.

In the instant case, the battery conditioning method may include terminating the cooling of the battery, upon concluding that the temperature of the battery reaches the high-power driving target temperature.

Meanwhile, according to an exemplary embodiment of the present disclosure, a battery conditioning apparatus of an eco-friendly vehicle includes a battery that stores electrical energy to drive the vehicle; and a vehicle controller configured to compare a charging completion expected temperature, which is a temperature of a battery provided in the vehicle expected at a point in time when fast charging is to be completed, and a high-power driving target temperature, which is a target temperature of the battery required at a point in time when high-power driving is to begin, upon receiving information related to a schedule to perform the high-power driving within a preset time period from a point in time when the fast charging of the battery is completed, and cooling the battery in a first cooling mode during the fast charging, upon concluding that the charging completion expected temperature is higher than the high-power driving target temperature In the instant case, the vehicle controller may compare a time required to cool the battery to the high-power driving target temperature and a time required for the vehicle to arrive at a destination from the point in time when the fast charging is to be completed; and derate a charging current for the battery, upon concluding that the time required to cool the battery to the high-power driving target temperature is longer than the time required for the vehicle to arrive at the destination after completing the fast charging.

In the instant case, the vehicle controller may cool the battery in a second cooling mode different from the first cooling mode, upon concluding that the charging completion expected temperature is equal to or lower than the high-power driving target temperature.

In the instant case, the vehicle controller may identify whether the battery is fast charging by an external power source, and compare the charging completion expected temperature and the high-power driving target temperature upon identifying that the battery is fast charging by the external power source.

In the instant case, the vehicle controller may compare a current temperature of the battery and a preset threshold temperature, upon concluding that the battery is not fast charging; and cool the battery in the first cooling mode, upon concluding that the temperature of the battery is higher than the preset threshold temperature.

In the instant case, the vehicle controller may cool the battery in a second cooling mode different from the first cooling mode, upon concluding that the temperature of the battery is equal to or lower than the preset threshold temperature.

In the instant case, the first cooling mode may be a maximum cooling mode in which a cooling system is used.

In the instant case, the second cooling mode may be a normal cooling mode which is performed by default during charging.

In the instant case, the vehicle controller may derate the charging current by matching an initial temperature of the battery, which may be cooled to the high-power driving target temperature by the time required to arrive at the destination from the point in time when the charging of the battery is to be completed, with that in a fast-charging map, so that the temperature of the battery can reach the initial temperature and then attain a state of equilibrium.

In the instant case, the vehicle controller may terminate the cooling of the battery, upon concluding that the temperature of the battery reaches the high-power driving target temperature.

With various embodiments of the present disclosure described as above, there are provided a method and apparatus for battery conditioning of an eco-friendly vehicle, in which the temperature of a battery is preemptively optimized when the vehicle is driven at high power under conditions that the temperature of the battery is high, preventing the driving performance of the vehicle from deteriorating due to battery power derating.

Furthermore, there is provided control technology for cooling the battery when it is identified that the battery is required to be cooled for the high-power driving of the vehicle as a result of checking the destination of the vehicle through a navigation system.

Furthermore, an estimated time required for cooling is checked when the battery is fast charging, and the charging current is derated as necessary, additionally managing the temperature of the battery.

The effects to be obtainable from the present disclosure are not limited to the forementioned effects, and other unmentioned effects may be clearly understood from the following description by a person having ordinary knowledge in the art to which the present disclosure pertains.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
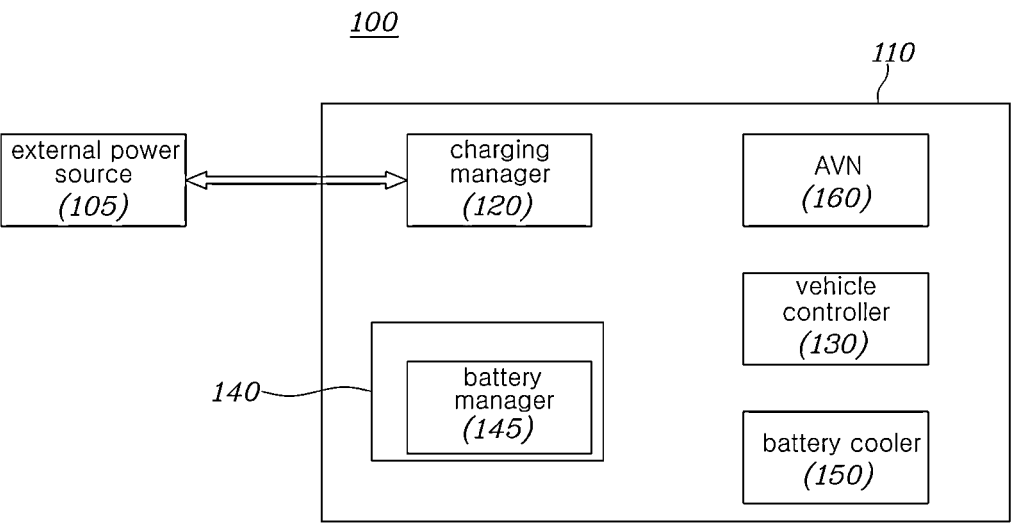
FIG. 1 is a block diagram schematically showing a battery conditioning system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings, in which the same or similar elements are denoted by the same reference numerals even though they are depicted in different drawings and redundant descriptions thereof will be avoided.

Suffixes "module" and "unit" put after components in the following description are provided in consideration of only ease of description and do not have meaning or functions discriminated from each other.

Furthermore, in terms of describing the exemplary embodiments of the present disclosure, detailed descriptions of related art will be omitted when they may make the subject matter of the exemplary embodiments of the present disclosure rather unclear. Furthermore, the accompanying drawings are provided only for a better understanding of the exemplary embodiments of the present disclosure and are not intended to limit technical ideas of the present disclosure. Therefore, it should be understood that the accompanying drawings include all modifications, equivalents and substitutions within the scope and spirit of the present disclosure.

Terms such as "first" and "second" may be used to describe various components, but the components should not be limited by the above terms. Furthermore, the above terms are used only for distinguishing one component from another.

When it is described that one component is "connected" or "joined" to another component, it should be understood that the one component may be directly connected or joined to another component, but additional components may be present therebetween. However, when one component is described as being "directly connected," or "directly coupled" to another component, it should be understood that additional components may be absent between the one component and another component.

Unless the context clearly dictates otherwise, singular forms include plural forms as well.

In an exemplary embodiment of the present disclosure, it should be understood that term "include" or "have" indicates that a feature, a number, a step, an operation, an element, a part, or the combination thereof described in the exemplary embodiments is present, but does not preclude a possibility of presence or addition of one or more other features, numbers, steps, operations, elements, parts or combinations thereof, in advance.

FIG. 1 is a block diagram schematically showing a battery conditioning system according to an exemplary embodiment of the present disclosure.

Referring to FIG. 1, a battery conditioning system 100 according to the present exemplary embodiment includes an external power source 105 and a battery conditioning apparatus 110.

In the instant case, a charger may be provided outside a vehicle, and the battery conditioning apparatus 110 may be provided inside the vehicle.

The external power source 105 supplies necessary power from the outside of the vehicle to a battery 140.

The battery conditioning apparatus 110 includes a charging manager 120, a vehicle controller 130, the battery 140, a battery cooler 150, and an audio-video-navigation (AVN) 160.

The charging manager 120 provides control functions related to the charging of the battery 140.

In the instant case, the charging manager 120 may be a vehicle charge management system (VCMS) of the vehicle.

The vehicle controller 130 identifies the states of the vehicle and is configured to control the controllers in the vehicle to maintain the optimum states.

For example, the vehicle controller 130 may receive information from a battery manager 145 of the battery 140 and the Audio, Video and Navigation (AVN) 160, and control them based on the received information.

In the instant case, the vehicle controller 130 may be a vehicle control unit (VCU) of the vehicle.

In a case where the vehicle is scheduled to be driven at high power within a predetermined time period after the fast charging of the battery, the vehicle controller 130 is configured to control the battery cooler 150 to cool the battery 140 when the temperature of the battery 140 after completing the charging is higher than a target temperature of the battery 140 for the high-power driving.

In the instant case, an expected temperature of the battery 140 after the charging may be calculated based on a current state of charge (SOC) value of the battery, a target SOC value of the battery, and a current temperature of the battery.

In the instant case, the predetermined time period may be set to an arbitrary time period, for example, 20 minutes.

In the instant case, the high-power driving may include racing track driving and ultra-high-speed driving.

In the instant case, whether the battery 140 is fast charging by the external power source 105 may be identified based on whether power supplied from the external power source 105 is greater than threshold power.

For example, when the power is greater than 50 kw, it may be identified that the battery is fast charging. When the power is less than or equal to 50 kw, it may be identified that the battery is slow charging.

In the instant case, the vehicle controller 130 may be configured for controlling the battery cooler 150 to cool the battery 140 in the maximum cooling mode according to charging or environmental conditions.

In the present specification, the maximum cooling mode may be defined as a first cooling mode.

For example, when a current battery temperature is 30° C., a battery temperature after completing the fast charging of the battery 140 is 45° C., and an initial temperature of the battery required to complete one lap of the Nürburgring is 35° C., the vehicle controller 130 may cool the battery 140 in the first cooling mode.

In the instant case, the vehicle controller 130 compares time required to cool the battery 140 to the target temperature by the battery cooler 150 and time required to complete the battery charging and arrive at a destination, and derate a charging current for the battery 140 when the time required to cool the battery 140 to the target temperature is longer than the time required to complete the charging of the battery and arrive at a destination.

In the instant case, the vehicle controller 130 may calculate each of the time required to cool the battery 140 to the target temperature, and the time required to complete the battery charging and arrive at a destination.

For example, the vehicle controller 130 may calculate each of the time required to cool the battery 140 to the target temperature, the time required to complete the charging, and the time taken in arriving at the Nürburgring after completing the charging of the battery 140, and identify whether the time required to reach the target temperature of the battery 140 is longer than the time taken in arriving at the destination after completing the charging.

For instance, when the time required to cool the battery from 45° C. to 35° C. is 25 minutes, and the time expected to arrive at the destination, i.e., the Nürburgring after completing the charging is 20 minutes, the vehicle controller 130 may derate the charging current for the battery 140 to perform the charging.

In the instant case, the vehicle controller 130 may derate the charging current by matching the initial temperature of the battery 140, which may be cooled to the target temperature by the time taken in arriving at the destination after completing the charging of the battery 140, with that in a fast-charging map, so that the temperature of the battery 140 can reach the initial temperature and then attain a state of equilibrium.

For example, when it takes 20 minutes to arrive at the destination after completing the charging of the battery 140 and the target temperature is 35° C., the vehicle controller 130 may match the temperature corresponding to the initial temperature of the battery, which may be cooled to 35° C. for 20 minutes, in the fast charging map.

For example, the initial temperature of the battery, which may be cooled to 35° C. for 20 minutes, may be 42° C. In the instant case, when the temperature of the battery 140 reaches 42° C., the vehicle controller 130 may derate the charging current so that the temperature of the battery 140 can attain the state of equilibrium at 42° C. without further increasing or decreasing.

The vehicle controller 130 may cool the battery or derate the charging current for the battery under the conditions of the following Table 1.

TABLE 1

| Driving condition | Charging condition | Conditions for operation in maximum cooling mode | Cooling method | | |
|---|---|---|---|---|---|
| | | | Cooling | Limiting charging power | Termination condition |
| Track driving or ultra-high-speed driving | Fast charging | (1) Track driving within certain time period after fast charging (2) Ultra-high-speed driving within certain time period after starting driving (user settings) (3) User settings | Cooling in maximum cooling mode | x | Termination upon reaching target temperature |
| | Fast charging | (1) Unable to reach target temperature at destination upon track driving within certain time period after fast charging (2) User settings | Cooling in maximum cooling mode | Derate charging current | |
| | High temperature environment | (1) Track driving within certain time period after fast charging (2) Ultra-high speed driving within certain time period after starting driving (user settings) (3) User settings | Cooling in maximum cooling mode | x | |

In the instant case, the vehicle controller 130 may cool the battery 140 in the maximum cooling mode from a point in time when the maximum cooling for the battery 140 is required in the fast charging map of the vehicle, and cool the battery 140 in a normal cooling mode until a point in time before that point in time. In the present specification, the normal cooling mode may be defined as a second cooling mode.

In the instant case, the vehicle controller 130 may enter the normal cooling mode when the temperature of the battery 140 reaches the target temperature, cooling the battery 140 in the normal cooling mode.

Furthermore, the vehicle controller 130 may terminate the cooling of the battery 140 upon key-off of the vehicle, and remeasure the temperature of the battery 140 and recalculate the time required for the cooling upon key-on of the vehicle, resetting a battery cooling mode.

The battery 140 stores electrical energy for driving the vehicle, and includes the battery manager 145.

The battery manager 145 measures the temperature of the battery 140 and the charging current for the battery 140, and transmits the measured temperature and the measured charging current to the vehicle controller 130.

In the instant case, the battery manager 145 may be a battery management unit (BMU) of the vehicle.

The battery cooler 150 cools the battery 140 up to the target temperature under control of the battery manager 145.

In the instant case, the battery cooler 150 may use an air-cooling method or a water-cooling method to cool the battery.

In the instant case, the battery cooler 150 may be a separate battery cooling system different from the cooling system of the vehicle.

For example, the battery cooler 150 may perform cooling based on the air-cooling method in the normal cooling mode, and perform cooling based on the water-cooling method in the maximum cooling mode.

The AVN 160 receives information from a user about the destination or about whether to perform the high-power driving for the vehicle within a predetermined time period after starting the driving or whether to cool the battery 140 in the maximum cooling mode after the fast charging.

In an exemplary embodiment of the present disclosure, the charging manager 120 may include a memory and a processor configured to execute one or more steps interpreted as an algorithm structure.

In an exemplary embodiment of the present disclosure, the battery manager 145 may include a memory and a processor configured to execute one or more steps interpreted as an algorithm structure.

In an exemplary embodiment of the present disclosure, the vehicle controller 130 may include a memory and a processor configured to execute one or more steps interpreted as an algorithm structure.

In an exemplary embodiment of the present invention, the battery manager 145, the charging manager 120 and the vehicle controller 130 may be configured as a single integrated control device.

Figure 2:
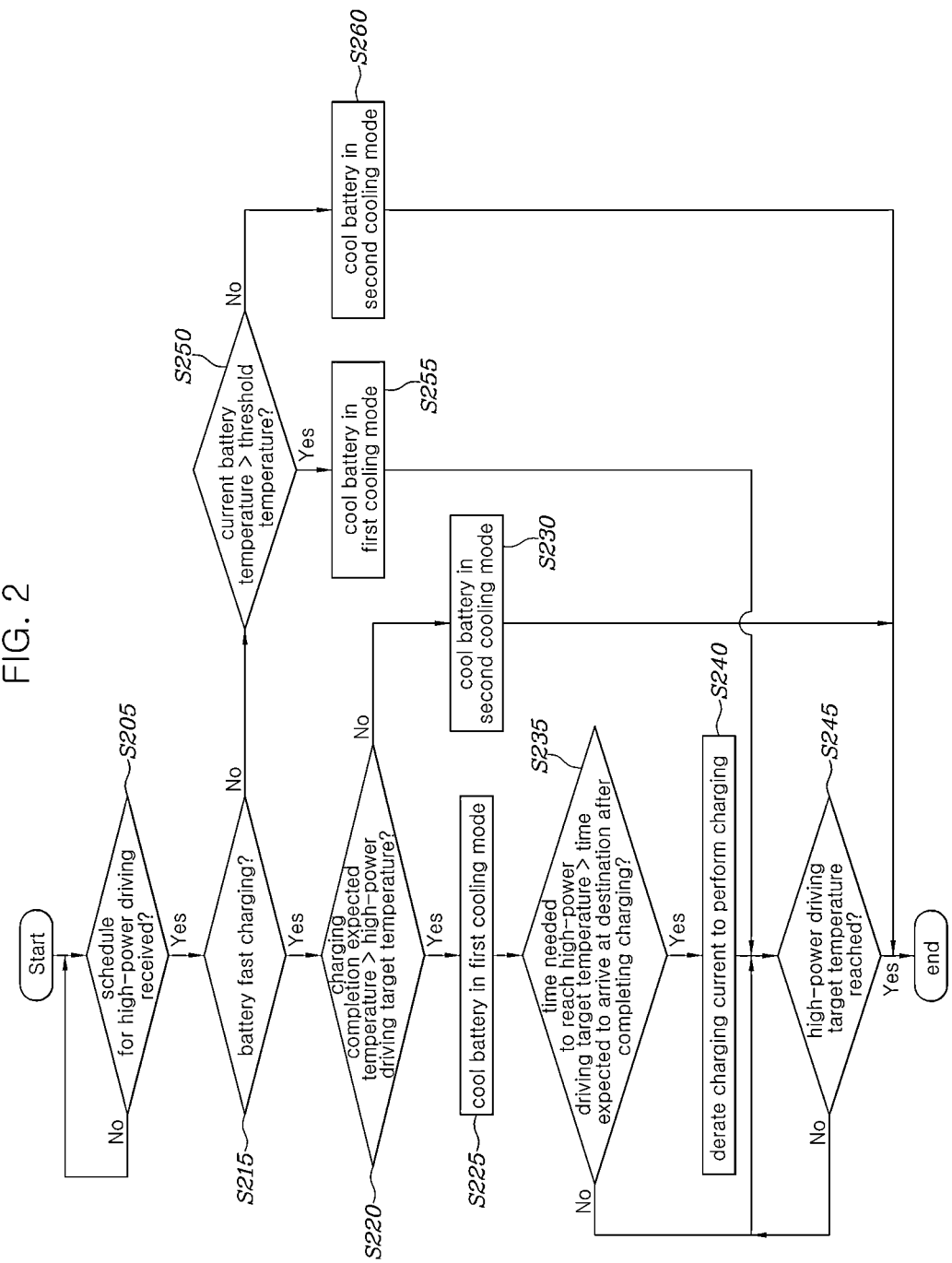
FIG. 2 is a flowchart showing a battery conditioning method according to an exemplary embodiment of the present disclosure.

FIG. 2 is a flowchart showing a battery conditioning method according to an exemplary embodiment of the present disclosure.

The battery conditioning method of FIG. 2 may be performed by the vehicle controller 130 of FIG. 1.

Referring to FIG. 2, the vehicle controller 130 identifies whether a schedule for performing the high-power driving within a predetermined time period after completing the fast charging of the battery is received from a user through the AVN 160 (S205).

In the instant case, the predetermined time period may be set to any time, for example, 20 minutes.

In the instant case, the high-power driving may include the racing track driving and the ultra-high-speed driving.

For example, the destination of the vehicle may be set to the Nürburgring, or a schedule may be input to complete one lap of the Nürburgring or to drive on the Autobahn at a speed of more than 200 kph for more than 20 minutes.

Furthermore, the vehicle controller 130 identifies whether the battery 140 is fast charging by the external power source 105 (S215).

In the instant case, whether the battery 140 is fast charging by the external power source 105 may be identified based on whether the power supplied from the external power source 105 is greater than threshold power.

For example, when the power is greater than 50 kw, it may be identified that the battery is fast charging. When the power is less than or equal to 50 kw, it may be identified that the battery is slow charging.

In the case where it is identified in step S215 that the battery 140 is fast charging, the vehicle controller 130 identifies whether a charging completion expected temperature, which is the temperature of the battery 140 expected at a point in time when the charging is to be completed, is higher than a high-power driving target temperature, which is the target temperature of the battery required at a point in time when the high-power driving is to begin (S220).

In the instant case, the charging completion expected temperature may be calculated based on the current SOC value of the battery, the target SOC value of the battery, and the current temperature of the battery.

For example, when a schedule is input to complete one lap of the Nürburgring, the vehicle controller 130 may calculate and compare the battery temperature after completing the fast charging of the battery 140 and the initial temperature of the battery required to complete one lap of the Nürburgring 1.

In the instant case, the high-power driving target temperature may be previously set in a read only memory (ROM) of the battery manager 145.

When it is identified in step S220 that the charging completion expected temperature is higher than the high-power driving target temperature, the vehicle controller 130 cools the battery 140 in the first cooling mode (S225).

For example, in the case where the current temperature of the battery is 30° C., the battery temperature after completing the fast charging of the battery 140 is 45° C., and the initial temperature of the battery required to complete one lap of the Nürburgring is 35° C., the vehicle controller 130 may cool the battery 140 in the first cooling mode.

In the instant case, the vehicle controller 130 may be configured for controlling the battery cooler 150 directly or control the battery cooler 150 through the battery manager 145, cooling the battery 140.

In the instant case, the first cooling mode may be the maximum cooling mode where the performance of the battery cooler 150 is maximized.

In the case where it is identified in step S220 that the charging completion expected temperature is not higher than the high-power driving target temperature, the vehicle controller 130 cools the battery 140 in the second cooling mode (S230).

In the instant case, the second cooling mode may be the normal cooling mode which is performed by default during the charging.

Furthermore, the vehicle controller 130 identifies whether the time needed to reach the high-power driving target temperature of the battery 140 is longer than the time expected to arrive at the destination after the charging is completed (S235), and derate the charging current for the battery 140 to perform the charging when the time required to reach the target temperature of the battery 140 is longer than the time expected to arrive at the destination after completing the charging (S240).

For example, the vehicle controller 130 may calculate each of a cooling time needed to reach the high-power driving target temperature, the time required to complete the charging, and the time taken in arriving at the Nürburgring after completing the charging of the battery 140, and identify whether the time required to reach the high-power driving target temperature is longer than the time expected to arrive at the destination after completing the charging.

For example, when the time required to cool the battery from 45° C. to 35° C. is 25 minutes, and the time expected to arrive at the destination, i.e., the Nürburgring after completing the charging is 20 minutes, the vehicle controller 130 may derate the charging current for the battery 140 to perform the charging.

In the instant case, the vehicle controller 130 may derate the charging current by matching the temperature corresponding to the initial temperature of the battery 140, which may be cooled to the high-power driving target temperature by the time taken in arriving at the destination after completing the charging of the battery 140, in a fast-charging map, so that the temperature of the battery 140 can reach the initial temperature and then attain the state of equilibrium.

For example, when it takes 20 minutes to complete the charging of the battery 140 and arrive at the destination and the high-power driving target temperature is 35° C., the vehicle controller 130 may match the temperature corresponding to the initial temperature of the battery, which may be cooled to 35° C. for 20 minutes, in the fast charging map.

For example, the initial temperature of the battery, which may be cooled to 35° C. for 20 minutes, may be 42° C. In the instant case, when the temperature of the battery 140 reaches 42° C., the vehicle controller 130 may derate the charging current so that the temperature of the battery 140 can attain the state of equilibrium at 42° C. without further increasing or decreasing.

Furthermore, the vehicle controller 130 identifies whether the temperature of the battery 140 reaches the high-power driving target temperature (S245), and terminates the charging when the temperature of the battery 140 reaches the high-power driving target temperature.

On the other hand, in the case where it is identified in step S215 that the battery 140 is not fast charging, the vehicle controller 130 identifies whether the current temperature of the battery 140 is higher than a threshold temperature (S250), and cools the battery 140 in the first cooling mode when the current temperature of the battery 140 is higher than the preset threshold temperature (S255).

In the case where it is identified in step S250 that the current temperature of the battery 140 is not higher than the preset threshold temperature, the vehicle controller 130 cools the battery 140 in the second cooling mode (S260).

On the other hand, it is identified in step S220 that the charging completion expected temperature is not higher than the high-power driving target temperature, the vehicle controller 130 cools the battery 140 in the second cooling mode (S230).

According to the foregoing embodiments of the present disclosure, it is possible to detect the abnormality of the battery in advance.

Furthermore, cell balancing technology for balancing a voltage deviation in the high-voltage battery is used to diagnose abnormal cells, providing logic for diagnosing the high-voltage battery.

Furthermore, the deterioration and abnormality of high-voltage battery cells are diagnosed while the vehicle is being driven, securing the safety of a driver.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured for processing data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A battery conditioning method of a vehicle, the battery conditioning method comprising:

measuring, by a controller, a real-time temperature of a battery and a state of charge (SOC) of the battery;

comparing, by the controller, a charging completion expected temperature, which is a temperature of the battery provided in the vehicle expected at a point in time when fast charging is to be completed, and a high-power driving target temperature, which is a target temperature of the battery required at a point in time when high-power driving is to begin, upon identifying that the high-power driving is to be performed within a preset time period from a point in time when the fast charging of the battery is completed; and controlling, by the controller, a first cooling mode of a battery cooler during the fast charging, upon concluding that the charging completion expected temperature is higher than the high-power driving target temperature.

2. The battery conditioning method of claim 1, further including:

comparing, by the controller, a time required to cool the battery to the high-power driving target temperature and a time required for the vehicle to arrive at a destination from the point in time when the fast charging is to be completed; and derating, by the controller, a charging current for the battery, upon concluding that the time required to cool the battery to the high-power driving target temperature is longer than the time required for the vehicle to arrive at the destination from the point in time when the fast charging is to be completed.

3. The battery conditioning method of claim 2, wherein the derating the charging current includes derating the charging current by looking up an initial temperature of the battery, which can be cooled to the high-power driving target temperature by the time required to arrive at the destination from the point in time when the charging of the battery is to be completed, in a fast-charging map, so that the temperature of the battery reaches the initial temperature and then attains a state of equilibrium.

4. The battery conditioning method of claim 1, further including cooling, by the controller, the battery in a second cooling mode different from the first cooling mode, upon concluding that the charging completion expected temperature is equal to or lower than the high-power driving target temperature.

5. The battery conditioning method of claim 4, wherein the second cooling mode includes a normal cooling mode which is performed by default during charging.

6. The battery conditioning method of claim 1, further including identifying, by the controller, whether the battery is fast charging by an external power source, wherein the comparing the charging completion expected temperature and the high-power driving target temperature is performed upon identifying that the battery is fast charging by the external power source.

7. The battery conditioning method of claim 6, further including:
  comparing, by the controller, a current temperature of the battery and a preset threshold temperature, upon concluding that the battery is not fast charging; and
  cooling, by the controller, the battery in the first cooling mode, upon concluding that the current temperature of the battery is higher than the preset threshold temperature.

8. The battery conditioning method of claim 7, further including cooling, by the controller, the battery in a second cooling mode different from the first cooling mode, upon concluding that the current temperature of the battery is equal to or lower than the preset threshold temperature.

9. The battery conditioning method of claim 1, wherein the first cooling mode includes a maximum cooling mode in which a cooling system is used.

10. The battery conditioning method of claim 1, further including terminating, by the controller, the cooling of the battery, upon concluding that the temperature of the battery reaches the high-power driving target temperature.

11. A battery conditioning apparatus of an eco-friendly vehicle, the battery conditioning apparatus comprising:
  a battery that stores electrical energy to drive the vehicle;
  a battery cooler;
  a vehicle controller configured to:
    measure a real-time temperature of the battery and a state of charge (SOC) of the battery;
    compare a charging completion expected temperature, which is a temperature of the battery provided in the vehicle expected at a point in time when fast charging is to be completed, and a high-power driving target temperature, which is a target temperature of the battery required at a point in time when high-power driving is to begin, upon identifying that the high-power driving is to be performed within a preset time period from a point in time when the fast charging of the battery is completed; and
    control a first cooling mode of the battery cooler during the fast charging, upon concluding that the charging completion expected temperature is higher than the high-power driving target temperature.

12. The battery conditioning apparatus of claim 11, wherein the vehicle controller is further configured to:
  compare a time required to cool the battery to the high-power driving target temperature and a time required for the vehicle to arrive at a destination from the point in time when the fast charging is to be completed; and
  derate a charging current for the battery, upon concluding that the time required to cool the battery to the high-power driving target temperature is longer than the time required for the vehicle to arrive at the destination from the point in time when the fast charging is to be completed.

13. The battery conditioning apparatus of claim 12, wherein the vehicle controller is further configured to derate the charging current by looking up an initial temperature of the battery, which can be cooled to the high-power driving target temperature by the time required to arrive at the destination from the point in time when the charging of the battery is to be completed, in a fast-charging map, so that the temperature of the battery reaches the initial temperature and then attains a state of equilibrium.

14. The battery conditioning apparatus of claim 11, wherein the vehicle controller is further configured to: cool the battery in a second cooling mode different from the first cooling mode, upon concluding that the charging completion expected temperature is equal to or lower than the high-power driving target temperature.

15. The battery conditioning apparatus of claim 14, wherein the second cooling mode includes a normal cooling mode which is performed by default during charging.

16. The battery conditioning apparatus of claim 11, wherein the vehicle controller is further configured to identify whether the battery is fast charging by an external power source, and compare the charging completion expected temperature and the high-power driving target temperature upon identifying that the battery is fast charging by the external power source.

17. The battery conditioning apparatus of claim 16, wherein the vehicle controller is further configured to:
  compare a current temperature of the battery and a preset threshold temperature, upon concluding that the battery is not fast charging; and
  cool the battery in the first cooling mode, upon concluding that the current temperature of the battery is higher than the preset threshold temperature.

18. The battery conditioning apparatus of claim 17, wherein the vehicle controller is further configured to cool the battery in a second cooling mode different from the first cooling mode, upon concluding that the current temperature of the battery is equal to or lower than the preset threshold temperature.

19. The battery conditioning apparatus of claim 11, wherein the first cooling mode includes a maximum cooling mode in which a cooling system is used.

20. The battery conditioning apparatus of claim 11, wherein the vehicle controller is further configured to terminate the cooling of the battery, upon concluding that the temperature of the battery reaches the high-power driving target temperature.

* * * * *